United States Patent [19]

Konkol et al.

[11] Patent Number: 4,711,648

[45] Date of Patent: Dec. 8, 1987

[54] PROCESS FOR PURIFICATION OF GASES

[75] Inventors: Werner Konkol, Oberhausen; Helmut Bahrmann, Hamminkeln-Brünen; Georg Dämbkes, Dinslaken; Wilhelm Gick, Duisburg; Ernst Wiebus, Oberhausen; Hanswilhelm Bach, Duisburg, all of Fed. Rep. of Germany

[73] Assignee: Ruhrchemie Aktiengesellschaft, Fed. Rep. of Germany

[21] Appl. No.: 906,455

[22] Filed: Sep. 11, 1986

[30] Foreign Application Priority Data

Sep. 14, 1985 [DE] Fed. Rep. of Germany ....... 3532955

[51] Int. Cl.$^4$ .............................................. B01D 19/00
[52] U.S. Cl. ............................................ 55/73; 55/68
[58] Field of Search ................................ 55/68, 71, 73

[56] References Cited

U.S. PATENT DOCUMENTS

| | | | |
|---|---|---|---|
| 3,760,564 | 9/1973 | Alders et al. | 55/73 |
| 4,609,389 | 9/1986 | Karwat | 55/68 |

FOREIGN PATENT DOCUMENTS

| | | | |
|---|---|---|---|
| 728444 | 4/1955 | United Kingdom | 55/73 |
| 860702 | 2/1961 | United Kingdom | 55/68 |

*Primary Examiner*—Bernard Nozick
*Attorney, Agent, or Firm*—Bierman & Muserlian

[57] ABSTRACT

A process for the purification of a gas containing one or more of hydrogen sulfide, hydrogen cyanide, and carbonyl sulfide as impurities comprising contacting the gas with at least one aliphatic aldehyde which is liquid under the purification conditions. The gas is inert to the aldehyde under such conditions. The process is useful in the purification of synthesis gas for use in reactions wherein sensitive catalysts are employed.

19 Claims, No Drawings

PROCESS FOR PURIFICATION OF GASES

The present invention relates to a process for the purification of gases which contain one or more of hydrogen sulfide, hydrogen cyanide, and carbonyl sulfide. While the new method is suitable for purifying all gases which are inert to the aldehydes used under the operating conditions, it has been found particularly useful for removing the above-mentioned impurities from hydrogen, carbon monoxide, carbon dioxide, saturated hydrocarbons, and mixtures thereof. It is especially valuable for use in connection with mixtures of hydrogen and carbon monoxide; e.g. synthesis gas.

As is well known, synthesis gas contains hydrogen and carbon monoxide in approximately equimolar amounts. Rarely does the ratio differ to any substantial degree. This gas is widely used in industrial processes; it is the starting material for the production of methanol, hydrocarbons (by the Fischer-Tropsch synthesis), and aldehydes (by hydroformylation of olefins). It is also used to produce methane, ethanol, acetic acid, as well as for the homologization of alcohols; i.e. lengthening the chain by one $CH_2$ to form the next higher alcohol of the series.

In order to carry out these reactions, highly active catalysts are being increasingly used. For example, copper catalysts have found application in the manufacture of methanol, and rhodium catalysts have been used in hydroformylation, homologization, and the production of ethanol. While such catalysts are useful in these processes, they are highly sensitive to the poisoning effects of various toxic substances; e.g. hydrogen sulfide, hydrogen cyanide, and carbonyl sulfide. In order to preserve and extend the life of such catalysts, it is of great importance to remove these impurities from the gas insofar as possible. By doing so, premature deactivation is avoided.

Synthesis gas will naturally contain a substantial number of impurities, depending upon the starting material used in its production. In particular, the above-mentioned impurities, as well as carbon disulfide, mercaptan, sulfur dioxide, and hydrogen chloride are found. In particular, synthesis gas manufactured from coal has an especially large amount of these impurities. On the other hand, the concentration is much lower when the gas is produced from crude oil or natural gas. Nonetheless, even in these latter cases, the amounts are sufficient to cause problems with deactivation of the catalysts.

In the past, both chemical and physical absorption processes have been used for purification of such gases. However, these processes are reversible; this means that the components which have been removed from the gas are released again during regeneration of the medium. Well known chemical absorbents are aqueous solutions of monoethanolamine, diethanolamine, and triethanolamine; potassium carbonate, sodium hydroxide, and sodium thioarsenite. Physical absorption is commonly carried out with methanol at low temperatures. In addition, such materials as propylene carbonate, N-methylpyrrolidone, and mixtures of polyethylene glycol-dimethylethers have been found suitable.

Chemical and physical absorption have been combined by binding the acidic gas components to agents which will react therewith coupled with the use of organic solvents. For example, one process uses a mixture of diisopropanolamine, sulfolane (tetrahydrothiophene dioxide), and water.

All of these processes are intended to reduce the catalyst poisons to concentrations which will render them safe for use therewith. However, due to the level of purity required, it is no longer possible to accomplish these aims economically; it has been found necessary to provide a second purification step which is specifically directed to reducing the sulfur content. The absorbents used vary with the specific type of sulfur compounds to be removed. For example, DE-OS No. 2 650 711 teaches the removal of hydrogen sulfide by the use of zinc oxide. U.S. Pat. No. 4,009,009 employs lead oxide on aluminum oxide to separate carbonyl sulfide from gases which contain no arsenic. EP No. 37 157 A2 and EP No. 37 158 A2 describe the use of zinc oxide to remove carbonyl sulfide and hydrogen cyanide, respectively. DE-AS No. 27 36 278 employs active carbon or basic ion exchange resins to eliminate iron pentacarbonyl. However, many of these known processes cannot be relied on to insure that all the unwanted impurities are removed from the raw gas. Others require expensive and complex apparatus to accomplish this result. Hence, the problem faced by the present inventors was to develop a method for purifying gases which does not suffer from the foregoing defects.

The present process is directed to the purification of a gas containing hydrogen sulfide, hydrogen cyanide, carbonyl sulfide, and mixtures thereof as impurities. It comprises contacting the gas with at least one aliphatic aldehyde which is liquid under the conditions of purification. The gas should be inert to the aldehyde under the operating conditions. The pressure, while not critical, is from 1 to 10 MPa and the temperature is 30° C. to 100° C. It is preferable to perform the extraction using countercurrent flow, with the aldehyde trickling down the column while the gas rises therethrough and is taken off at the top. The aldehyde (containing the impurities) is withdrawn from the bottom.

Surprisingly, it has been found that the foregoing process results in products of extremely high purity; so much so that it is possible to remove even hydrogen cyanide from the stream to a point that only barely detectable traces of this material remain. At this level, they have no substantial adverse effect on even sensitive catalysts.

While the particular aldehydes are not critical, it has been found preferable to use those having 4 to 10 carbon atoms. These aldehydes can be mixed, both straight and branched chain; all produce good results. In particular, mixtures of normal and isoaldehydes have been used quite successfully. Such mixtures are produced during the hydroformylation of olefins. Thus, it is a feature of the present invention that such mixtures can readily be employed.

It should be noted that, as previously stated, any gas which is inert to the aldehydes used under the process conditions can be purified in accordance with the present invention. The source of the raw gas is of no importance; for example, synthesis gas produced from crude oil, hard coal, or lignite, can all be rendered free of the aforementioned impurities by the present method.

The process can remove these impurities in the usual concentrations in which they appear as a result of normal industrial production; i.e. of the order of about 100 ppm by volume of each impurity. These are reduced to levels of 1 ppm and even to a point below the limit of detection. This process is particularly advantageous to remove such impurities which are present in small concentrations; i.e. up to 10 ppm by volume and, in particular, 5 to 10 ppm. In these cases, the present process should generally be preceded by a cleaning step which will remove the bulk of the impurities in question. The various chemical and physical methods described herein as part of the prior art are suitable for such a step.

While the invention can be carried out within wide ranges of temperature and pressure, pressures of 1 to 10 MPa and temperatures of 30° to 100° C. are appropriate. Preferably, these ranges should be 1.5 to 8 MPa and 50° to 80° C. Since these conditions can vary widely, they provide substantial flexibility so that they can be selected to maintain the aldehyde as a liquid.

Known extraction columns are suitable for the present process and details thereof are unnecessary to the person of ordinary skill in the art. Such columns can, of course, be filled with any of the usual packing materials, including ring or saddle packing, as well as steel spirals. The latter have been found particularly suitable. It is preferred that the aldehyde be introduced at the head of the column and the gas to be cleaned introduced adjacent the base. The resultant countercurrent flow will provide good mixing and intimate contact. The purified gas comes off the top and the residue consisting of aldehyde and the impurities is withdrawn from the bottom.

It has been found that at least 0.5 liters of aldehyde per cubic meter of raw gas produces good results. The maximum aldehyde used is governed primarily by economics, and not by the limitations of the process itself. It has been found particularly suitable to employ 1 to 4 liters of aldehyde per cubic meter of gas and especially preferred to use 1 to 2 liters per cubic meter of gas. The process is adapted to both continuous and discontinuous operation.

If it is desired to recover the aldehyde, the residue from the extraction column is distilled. Hydrogen sulfide and carbonyl sulfide are collected at the head of the distillation column. However, the hydrogen cyanide forms cyanohydrin and is removed from the bottom of the column.

The following examples are intended to illustrate the present invention.

EXAMPLE 1

An extraction column packed with Raschig rings and having a height of 290 mm and a diameter of 63 mm is provided. Synthesis gas containing 1 mg/m$^3$ HCN, 0.8 mg/m$^3$H$_2$S, and 1.5 mg/m$^3$ COS is fed into the lower portion of the column at the rate of 5 m$^3$/h. At the same time, 8 liters per hour of a mixture of 95 parts by weight n-butyraldehyde and 5 parts by weight i-butyraldehyde are introduced at the head of the column. The pressure is 5.2 MPa and the temperature is 35° C. The aldehyde mixture trickles down as the gas moves up. When the purified gas is taken off the top of the column, the above-mentioned impurities can no longer be detected therein. The gas can then be used as such for hydroformylation of olefins in the presence of rhodium catalysts. In using gas purified by the present invention in such a reaction, no reduction in catalyst life is noted. However, if the gas has not been purified, the catalyst is rapidly deactivated.

EXAMPLE 2

The process of Example 1 was repeated using 10 m$^3$/h synthesis gas having an HCN content of 10 mg/m$^3$. Countercurrent flow was accomplished by introducing 5 liters per hour of i-nonanal at 1.5 MPa and 40° C. As in the case of Example 1, no HCN could be detected in the product gas.

While only a limited number of specific embodiments of the present invention have been expressly disclosed, it is, nonetheless, to be broadly construed, and not to be limited except by the character of the claims appended hereto.

What we claim is:

1. A process for the removal of at least one contaminant selected from the group consisting of hydrogen sulfide, carbonyl sulfide and hydrogen cyanide from a gas containing the same comprising contacting said gas with at least one liquid aliphatic aldehyde at a temperature of 30° C.–100° C. to absorb the contaminant(s) from the gas, said gas being inert to the aldehyde and recovering the contaminant depleted off gas.

2. The process of claim 1 wherein said aldehyde has 4 to 10 carbon atoms.

3. The process of claim 1 wherein mixtures of said aldehydes are employed.

4. The process of claim 1 wherein said gas is taken from the class consisting of hydrogen, carbon monoxide, carbon dioxide, saturated hydrocarbons, and mixtures thereof.

5. The process of claim 1 wherein said gas comprises a mixture of hydrogen and carbon monoxide.

6. The process of claim 1 wherein said purification is carried out at a pressure of 1 to 10 MPa.

7. The process of claim 6 wherein said pressure is 1.5 to 8 MPa and said temperature is 50° to 80° C.

8. The process of claim 6 wherein said aldehyde has 4 to 10 carbon atoms, there being at least 0.5 liters of said aldehyde per cubic meter of said gas, said gas being taken from the class consisting of hydrogen, carbon monoxide, carbon dioxide, saturated hydrocarbons, and mixtures thereof, said impurities not exceeding 100 ppm by volume based on said gas, said process being carried out in an extraction column, said aldehyde entering said column overhead and being withdrawn as bottom liquid, said gas entering said column from below and being drawn off overhead.

9. The process of claim 8 wherein mixtures of said aldehydes are employed.

10. The process of claim 9 wherein said aldehyde is a mixture of n-butyraldehyde and i-butyraldehyde.

11. The process of claim 1 wherein each of said impurities does not exceed 100 ppm by volume based on said gas.

12. The process of claim 11 wherein each of said impurities is from less than 1 ppm by volume to 100 ppm by volume.

13. The process of claim 11 wherein each of said impurities does not exceed 10 ppm by volume based on said gas.

14. The process of claim 13 wherein each of said impurities is 5 to 10 ppm by volume based on said gas.

15. The process of claim 1 wherein the amount of said aldehyde per cubic meter of said gas is at least 0.5 liters.

16. The process of claim 15 wherein said amount is 1 to 4 liters.

17. The process of claim 16 wherein said amount is 1 to 2 liters.

18. The process of claim 1 wherein said aldehyde flows countercurrently to said gas.

19. The process of claim 18 wherein said aldehyde enters an extraction column from overhead and is withdrawn as bottom liquid and said gas enters said column from below and is drawn off overhead.

* * * * *